United States Patent
Wang (10) Patent No.: US 11,228,446 B2
(45) Date of Patent: Jan. 18, 2022

(54) BLOCKCHAIN-BASED RECONCILIATION METHOD AND APPARATUS AND ELECTRONIC DEVICE

(71) Applicant: ADVANCED NEW TECHNOLOGIES CO., LTD., Grand Cayman (KY)

(72) Inventor: Shiyu Wang, Hangzhou (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 0 days.

(21) Appl. No.: 16/876,036

(22) Filed: May 16, 2020

(65) Prior Publication Data
US 2020/0280450 A1    Sep. 3, 2020

Related U.S. Application Data

(63) Continuation of application No. PCT/CN2020/070872, filed on Jan. 8, 2020.

(30) Foreign Application Priority Data

May 10, 2019   (CN) .......................... 201910389089.8

(51) Int. Cl.
*H04L 29/06* (2006.01)
*H04L 9/32* (2006.01)
(Continued)

(52) U.S. Cl.
CPC ........ *H04L 9/3247* (2013.01); *G06F 16/9035* (2019.01); *H04L 9/0643* (2013.01); *H04L 9/30* (2013.01); *H04L 2209/38* (2013.01)

(58) Field of Classification Search
CPC ....... H04L 9/0637; H04L 9/0643; H04L 9/30; H04L 9/32; H04L 9/3236; H04L 9/3239;
(Continued)

(56) References Cited

U.S. PATENT DOCUMENTS

2012/0030468 A1    2/2012   Papamanthou et al.
2015/0222619 A1    8/2015   Hughes et al.
(Continued)

FOREIGN PATENT DOCUMENTS

CN    105447407 A    3/2016
CN    106789095 A    5/2017
(Continued)

OTHER PUBLICATIONS

Pieter Wuille, When and how does bitcoin sync itself?, Oct. 2017, Bitcoin Stack Exchange (https://bitcoin.stackexchange.com), pp. 1-2 (Year: 2017).*

(Continued)

*Primary Examiner* — Tri M Tran (57) ABSTRACT

Methods, systems, and apparatus, including computer programs encoded on computer storage media, for blockchain-based reconciliation are provided. One of the methods includes: creating, by a first blockchain node associated with a blockchain, an account-processing record based on an account-processing operation; generating, by the first blockchain node, a digital signature on the account-processing record by encrypting a digest of the account-processing record using a private key associated with the first blockchain node; and uploading, by the first blockchain node, the account-processing record and the generated digital signature to the blockchain, wherein the account-processing record is stored in the blockchain upon one or more second blockchain nodes confirming the account-processing record based on the digital signature.

18 Claims, 4 Drawing Sheets

(51) Int. Cl.
*H04L 9/06* (2006.01)
*G06F 16/9035* (2019.01)
*H04L 9/30* (2006.01)

(58) Field of Classification Search
CPC . H04L 9/3247; H04L 9/3249; H04L 2209/38; G06F 16/1805; G06F 16/181; G06F 16/1815; G06F 16/182; G06F 16/20; G06F 16/21; G06F 16/219; G06F 16/23; G06F 16/2365; G06F 16/2379; G06F 16/9035; G06Q 20/3287; G06Q 20/382; G06Q 20/3825; G06Q 20/389; G06Q 20/401
See application file for complete search history.

(56) References Cited

U.S. PATENT DOCUMENTS

| | | | |
|---|---|---|---|
| 2015/0310431 A1* | 10/2015 | Lakshmanan | G06Q 20/02 705/71 |
| 2017/0017958 A1 | 1/2017 | Scott et al. | |
| 2017/0243193 A1 | 8/2017 | Manian et al. | |
| 2017/0295023 A1* | 10/2017 | Madhavan | H04L 9/3247 |
| 2018/0121911 A1 | 5/2018 | Hallam et al. | |
| 2018/0183768 A1 | 6/2018 | Lobban et al. | |
| 2019/0052454 A1 | 2/2019 | Wright et al. | |
| 2019/0057382 A1 | 2/2019 | Wright et al. | |
| 2019/0158470 A1 | 5/2019 | Wright et al. | |
| 2019/0235946 A1 | 8/2019 | Guo et al. | |
| 2019/0303445 A1* | 10/2019 | Padmanabhan | G06F 16/256 |
| 2019/0358515 A1 | 11/2019 | Tran et al. | |
| 2020/0065298 A1 | 2/2020 | Pattanaik et al. | |
| 2020/0119905 A1* | 4/2020 | Revankar | G06Q 20/06 |
| 2020/0167773 A1* | 5/2020 | Cervenka | G06Q 20/38 |
| 2020/0226677 A1* | 7/2020 | Dhawan | G06Q 20/065 |
| 2020/0334204 A1* | 10/2020 | Irazabal | G06F 16/1837 |

FOREIGN PATENT DOCUMENTS

| | | |
|---|---|---|
| CN | 107194798 A | 9/2017 |
| CN | 108416589 A | 8/2018 |
| CN | 108712431 A | 10/2018 |
| CN | 109493202 A | 3/2019 |
| CN | 109670924 A | 4/2019 |
| CN | 110263582 A | 9/2019 |
| KR | 10-2051288 B1 | 12/2019 |
| TW | 201909085 A | 3/2019 |
| WO | 2017/173271 A1 | 10/2017 |
| WO | 2017/187398 A1 | 11/2017 |
| WO | 2017/195161 A1 | 11/2017 |

OTHER PUBLICATIONS

Castro et al., Practical Byzantine Fault Tolerance, Feb. 1999, Proceedings of the Third Symposium on Operating Systems Design and Implementation, pp. 1-14 (Year: 1999).*
Castro et al, Practical Byzantine Fault Tolerance and Proactive Recovery, Nov. 2002, ACM Transactions on Computer Systems, vol. 20, No. 4, pp. 398-461. (Year: 2002).*
Kai Lei et al., Reputation-based Byzantine Fault-Tolerance for Consortium Blockchain, 2018, 2018 IEEE 24th International Conference on Parallel and Distributed Systems (ICPADS), pp. 604-611 (Year: 2018).*
First Search dated May 16, 2020, issued in related Chinese Application No. 201910389089.8 (2 pages).
First Office Action dated May 25, 2020, issued in related Chinese Application No. 201910389089.8, with English machine translation (19 pages).
Second Office Action dated Jul. 13, 2020, issued in related Chinese Application No. 201910389089.8, with English machine translation (25 pages).
Written Opinion and International Search Report for PCT Application No. PCT/CN2020/070872 made available to public on Nov. 19, 2020.
Search Report for Taiwanese Application No. 109100897 dated Feb. 26, 2021.

* cited by examiner

BLOCKCHAIN-BASED RECONCILIATION METHOD AND APPARATUS AND ELECTRONIC DEVICE

CROSS-REFERENCE TO RELATED APPLICATION

This application is a continuation application of International Patent Application No. PCT/CN2020/070872, filed with the China National Intellectual Property Administration (CNIPA) on Jan. 8, 2020, which is based on and claims priority to and benefit of Chinese Patent Application No. 201910389089.8, filed with the CNIPA on May 10, 2019. The entire contents of all of the above-identified applications are incorporated herein by reference.

TECHNICAL FIELD

The specification relates to the field of computer technologies, and in particular, to a consortium-blockchain-based reconciliation method and system.

BACKGROUND

Currently, a reconciliation operation between financial institutions is usually based on a reconciliation statement given by each financial institution every day. Specifically, after the end of everyday transaction, financial institutions give each other their respective reconciliation statements. Each financial institution performs an account reconciliation operation after obtaining the reconciliation statement provided by other financial institutions.

In an existing scenario of reconciliation between financial institutions, once a reconciliation abnormality occurs during a reconciliation process in a day, errors usually have to be handled and resolved afterwards, which is not effective.

Therefore, a reconciliation method is urgently required to resolve the existing problem of reconciliation abnormalities during the reconciliation between financial institutions.

SUMMARY

Embodiments of the specification provide a blockchain-based reconciliation system, method, storage medium, apparatus, and an electronic device to resolve a processing hysteresis problem when a reconciliation abnormality occurs during the reconciliation between financial institutions in the existing technologies.

To resolve the above technical problems, the embodiments of the specification are implemented in the following way.

A first aspect provides a consortium-blockchain-based reconciliation system, wherein the system includes an account-processing node and an account-authenticating node. The account-processing node is configured to create an account-processing record based on an account-processing operation, and upload the account-processing record to a consortium blockchain. The account-authenticating node is configured to confirm the account-processing record.

A second aspect provides a consortium-blockchain-based reconciliation method, wherein the method is applied to an account-processing node, and the method includes: creating an account-processing record based on an account-processing operation; and uploading the account-processing record to a consortium blockchain for an account-authenticating node in the consortium blockchain to confirm the account-processing record.

A third aspect provides a consortium-blockchain-based reconciliation method, wherein the method is applied to an account-authenticating node, and the method includes: confirming an account-processing record, wherein the account-processing record is created by an account-processing node based on an account-processing operation and uploaded by the account-processing node to a consortium blockchain.

A fourth aspect provides an account-processing node, including: a creation unit, configured to create an account-processing record based on an account-processing operation; and an uploading unit, configured to upload the account-processing record to a consortium blockchain for an account-authenticating node in the consortium blockchain to confirm the account-processing record.

A fifth aspect provides an account-authenticating node, including: a confirmation unit, configured to confirm an account-processing record, wherein the account-processing record is created by an account-processing node based on an account-processing operation and uploaded by the account-processing node to a consortium blockchain.

A sixth aspect provides an electronic device, including: a processor; and a memory arranged to store computer-executable instructions that, when executed, cause the processor to perform the following operations: creating an account-processing record based on an account-processing operation; and uploading the account-processing record to a consortium blockchain for an account-authenticating node in the consortium blockchain to confirm the account-processing record.

A seventh aspect provides a computer-readable storage medium, wherein the computer-readable storage medium stores one or more programs that, when executed by an electronic device including a plurality of applications, cause the electronic device to perform the following operations: creating an account-processing record based on an account-processing operation; and uploading the account-processing record to a consortium blockchain for an account-authenticating node in the consortium blockchain to confirm the account-processing record.

An eighth aspect provides an electronic device, including: a processor; and a memory arranged to store computer-executable instructions that, when executed, cause the processor to perform the following operations: confirming an account-processing record, wherein the account-processing record is created by an account-processing node based on an account-processing operation and uploaded by the account-processing node to a consortium blockchain.

A ninth aspect provides a computer-readable storage medium, wherein the computer-readable storage medium stores one or more programs that, when executed by an electronic device including a plurality of applications, cause the electronic device to perform the following operations: confirming an account-processing record, wherein the account-processing record is created by an account-processing node based on an account-processing operation and uploaded by the account-processing node to a consortium blockchain.

In a further aspect, a computer-implemented method for blockchain-based reconciliation is provided. According to one embodiment, the method includes: creating, by a first blockchain node associated with a blockchain, an account-processing record based on an account-processing operation; generating, by the first blockchain node, a digital signature on the account-processing record by encrypting a digest of the account-processing record using a private key associated with the first blockchain node; and uploading, by the first blockchain node, the account-processing record and the generated digital signature to the blockchain, wherein the account-processing record is stored in the blockchain upon one or more second blockchain nodes confirming the account-processing record based on the digital signature.

In another aspect, a system for blockchain-based reconciliation is provided. According to one embodiment, the system includes a processor and a non-transitory computer-readable storage medium storing instructions executable by the processor to cause the system to perform operations. The operations include: creating, by a first blockchain node associated with a blockchain, an account-processing record based on an account-processing operation; generating, by the first blockchain node, a digital signature on the account-processing record by encrypting a digest of the account-processing record using a private key associated with the first blockchain node; and uploading, by the first blockchain node, the account-processing record and the generated digital signature to the blockchain, wherein the account-processing record is stored in the blockchain upon one or more second blockchain nodes confirming the account-processing record based on the digital signature.

In yet another aspect, a non-transitory computer-readable storage medium for blockchain-based reconciliation is provided. According to one embodiment, the medium is configured with instructions executable by one or more processors to cause the one or more processors to perform operations. The operations include: creating, by a first blockchain node associated with a blockchain, an account-processing record based on an account-processing operation; generating, by the first blockchain node, a digital signature on the account-processing record by encrypting a digest of the account-processing record using a private key associated with the first blockchain node; and uploading, by the first blockchain node, the account-processing record and the generated digital signature to the blockchain, wherein the account-processing record is stored in the blockchain upon one or more second blockchain nodes confirming the account-processing record based on the digital signature.

In an embodiment, the method or the operations further comprise confirming, by each of the one or more second blockchain nodes, the account-processing record based on the digital signature.

In an embodiment, the confirming the account-processing record based on the digital signature comprises: obtaining a first digest of the account-processing record; decrypting the digital signature using a public key associated with the first blockchain node to obtain a second digest of the account-processing record; and determining whether the first digest is identical to the second digest.

In an embodiment, the obtaining a first digest of the account-processing record comprises: applying a hash function on the account-processing record.

In an embodiment, wherein the blockchain is synchronized on a plurality of blockchain nodes associated with a blockchain network, the plurality of blockchain nodes comprising the first blockchain node and the one or more second blockchain nodes.

In an embodiment, the method or the operations further comprise confirming, by the first blockchain node, a different account-processing record uploaded by one of the one or more second blockchain nodes.

In an embodiment, the method or the operations further comprise: creating, by one of the one or more second blockchain nodes, a different account-processing record based on a different account-processing operation; and uploading, by the one of the one or more second blockchain nodes, the account-processing record to the blockchain.

The embodiments of the specification can achieve at least the following technical effects by using the foregoing technical solutions. Taking an advantage of the characteristic that information in the consortium blockchain is non-falsifiable and that data uploaded to a block needs to be confirmed by other nodes, the account-processing node uploads all account-processing records to the consortium blockchain. After the account-processing records are confirmed by other nodes other than the account-processing node (that is, account-authenticating nodes), the account-processing records are synchronized. The problem of high falsifiability of original reconciliation data is avoided, and because each account-processing record is confirmed in time, effectiveness of a reconciliation process is improved.

BRIEF DESCRIPTION OF THE DRAWINGS

The accompanying drawings described herein are used for providing further understanding for the specification and constitute a part of the specification. Embodiments of the specification and descriptions thereof are used for explaining the specification and do not constitute any limitation to the specification.

DETAILED DESCRIPTION

To make the objectives, technical solutions, and advantages of the specification clearer, the following description clearly and completely describes the technical solutions of the specification with reference to specific embodiments of the specification and the corresponding accompanying drawings. The described embodiments are only some embodiments rather than all the embodiments of the specification. All other embodiments obtained by a person of ordinary skill in the art based on the embodiments of the specification without creative efforts shall fall within the protection scope of the specification.

The technical solution provided by various embodiments of the specification will be described in detail below with reference to the accompanying drawings.

To resolve the processing hysteresis problem when a reconciliation abnormality occurs during the reconciliation between financial institutions, an embodiment of the specification provides a consortium-blockchain-based reconciliation system.

Figure 1:
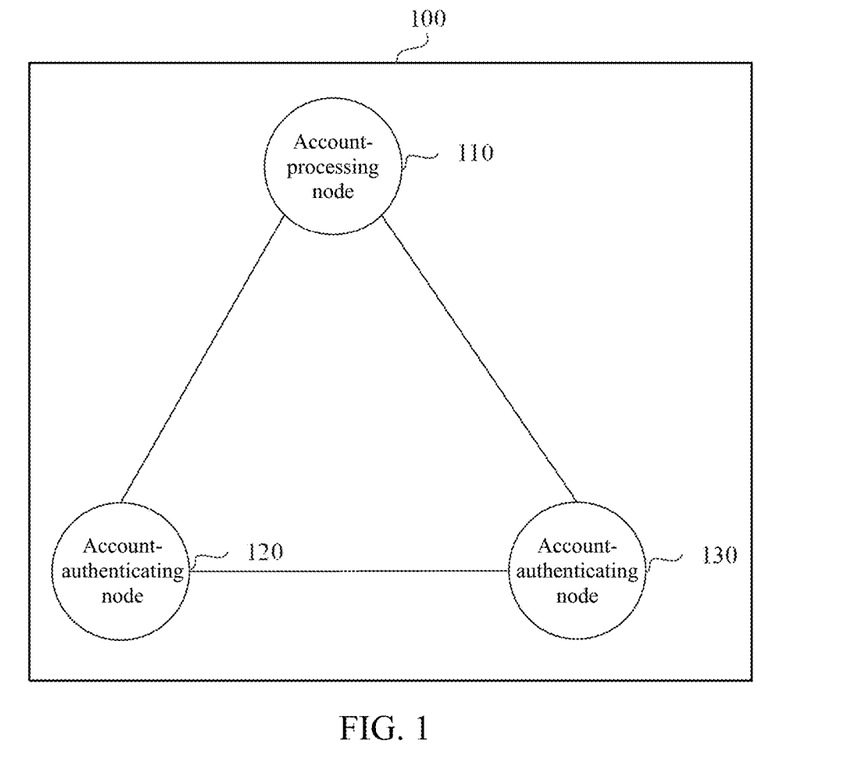
FIG. 1 is a schematic structural diagram of a consortium-blockchain-based reconciliation system, according to an embodiment of the specification.

Specifically, as shown in FIG. 1, a schematic structural diagram of a blockchain system, such as a consortium-blockchain-based system 100 according to one or more embodiments of the specification includes an account-processing node 110 and an account-authenticating node 120.

A first blockchain node (e.g., the account-processing node 110) is configured to create an account-processing record based on an account-processing operation, and upload the account-processing record to a blockchain, such as a consortium blockchain.

A second blockchain node (e.g., the account-authenticating node 120) is configured to confirm the account-processing record.

In the consortium blockchain, both the account-processing node and the account-authenticating node store full account book information about the account-processing node and the account-authenticating node. In one or more embodiments of the specification, the system has this advantage to improve time-effectiveness of reconciliation. After obtaining each account-processing record through processing, the account-processing node may send the account-processing record to other nodes in the consortium blockchain for confirmation. If none of the other nodes disagrees with the processing process in the account-processing record, the account-processing record is confirmed and can be stored in a block of each node.

In an embodiment, to ensure that the account-processing record uploaded to the consortium blockchain is uploaded by the account-processing node, the account-processing record uploaded to the consortium blockchain specifically includes a signature (i.e., a digital signature) affixed by the account-processing node to a digest of the account-processing record, and an original account-processing record. The digital signature may be generated by encrypting the digest of the account-processing record. Therefore, the uploading, by the account-processing node 110, the account-processing record to the consortium blockchain includes: signing, by the account-processing node 110, a digest of the account-processing record by encrypting the digest of the account-processing record using a private key associated with the account-processing node; and uploading, by the account-processing node 110, the signature (i.e., a digital signature) on the digest of the account-processing record and the account-processing record to the consortium blockchain.

In an embodiment, to ensure that the account-processing record uploaded to the consortium blockchain is uploaded by the account-processing node, other nodes in the consortium blockchain may verify the account-processing record, that is, verify an identity of the uploading node. Therefore, the confirming, by the account-authenticating node 120, the account-processing record includes: confirming, by the account-authenticating node 120, the account-processing record based on the signature on the account-processing record and the account-processing record. The account-processing record is stored in the blockchain upon one or more account-authenticating nodes confirming the account-processing record based on the digital signature.

In an embodiment, the confirming, by the account-authenticating node 120, the account-processing record based on the signature on the digest of the account-processing record and the account-processing record includes: obtaining, by the account-authenticating node 120, a first digest of the account-processing record; decrypting, by the account-authenticating node 120, the signature on the digest of the account-processing record based on a public key associated with the account-processing node, to obtain a second digest of the account-processing record prior to the signature processing or signing; and confirming, by the account-authenticating node 120, the account-processing record based on whether the first digest is consistent with the second digest, such that the first digest is identical to the second digest.

In some embodiments, the first digest of the account-processing record is a first digest obtained by hash processing (i.e., applying a hash function) on an original account-processing record uploaded by the account-processing node 110 to the consortium blockchain. The second digest may be obtained by decrypting the signature on the digest of the account-processing record by using a public key. Specifically, the second digest=the signature on the digest of the account-processing record÷the public key.

In some embodiments, there may be a plurality of account-processing nodes and a plurality of account-authenticating nodes in one or more embodiments of the specification. The role of the account-processing node is interchangeable with the role of the account-authenticating node. In other words, after the account-processing node creates an account-processing record based on an account-processing operation and uploads the account-processing record to a consortium blockchain, other nodes in the consortium blockchain (including the account-processing node) can be converted to the account-authenticating nodes. After the account-authenticating node creates an account-processing record based on an account-processing operation and uploads the account-processing record to a consortium blockchain, other nodes in the consortium blockchain (including the account-processing node) can be converted to the account-authenticating nodes.

In an embodiment, the account-processing node 110 is further configured to: confirm the account-processing record uploaded by the account-authenticating node 120 to the consortium blockchain, or an account-processing record uploaded by another one of account-authenticating nodes.

In an embodiment, the account-authenticating node 120 is further configured to: create a different account-processing record based on a different account-processing operation, and upload the different account-processing record to the consortium blockchain.

Figure 2:
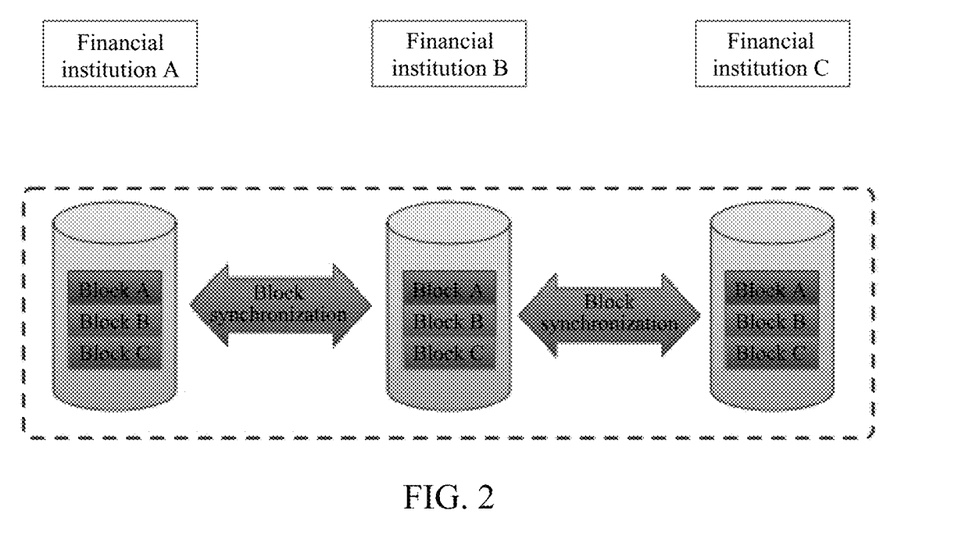
FIG. 2 is an overall schematic structural diagram of a consortium blockchain, according to an embodiment of the specification.
Figure 3:
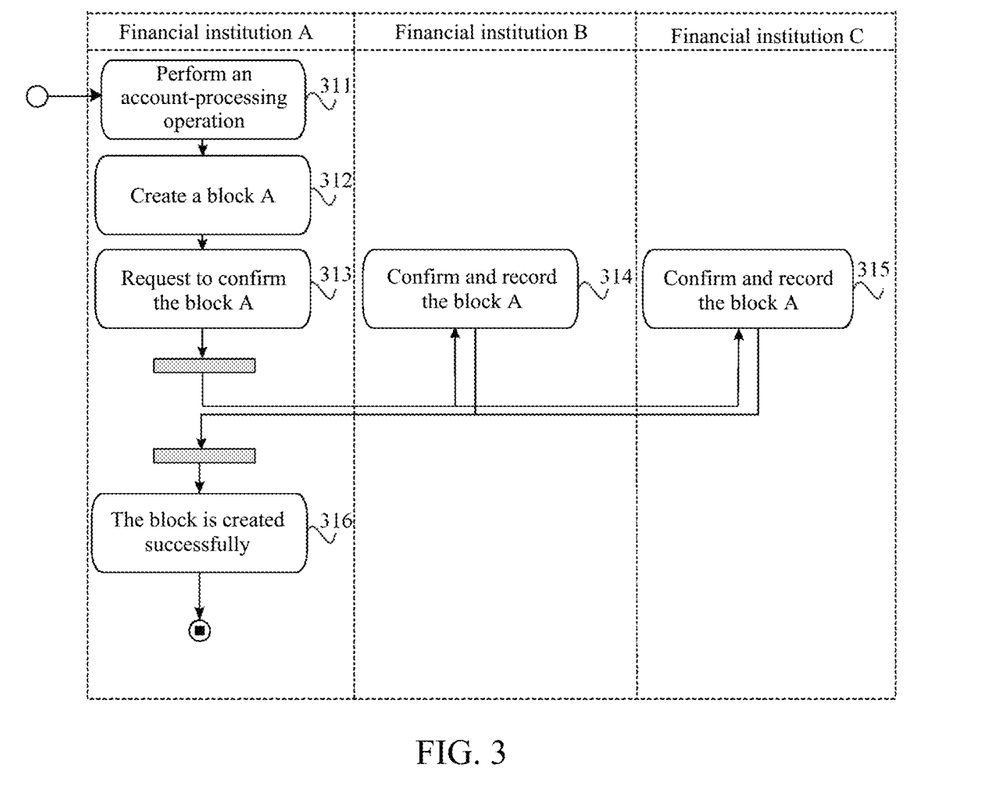
FIG. 3 is a schematic flowchart of a consortium-blockchain-based reconciliation method implemented on each node in a consortium blockchain, according to an embodiment of the specification.

The following describes a system processing process provided in an embodiment of the specification in detail by using examples of FIG. 2, which is an overall schematic structural diagram of a consortium blockchain, and FIG. 3, which is a schematic flowchart of applying a consortium-blockchain-based reconciliation method to each node.

In FIG. 2, an overall structure of the consortium blockchain includes a financial institution A, a financial institution B, and a financial institution C. The financial institution A, the financial institution B, and the financial institution C may be either the account-processing node or the account-authenticating node described above.

For example, the financial institution A is an account-processing node and both financial institution B and financial institution C are account-authenticating nodes. After the financial institution A performs an account-processing operation, in order to avoid falsification of the account-processing record, a corresponding block A may be created and used to store the account-processing record. Subsequently, a request for confirming the account-processing record may be sent to the financial institution B and the financial institution C in the consortium blockchain. After a confirmation feedback is received from other nodes in the consortium blockchain, that is, both the financial institution B and the financial institution C, the block A is successfully created. At the same time, the block A is also recorded in other nodes in the consortium blockchain. By analogy, the method for confirming a block B created by the financial institution B or a block C created by the financial institution C is similar to that of the block A.

As shown in FIG. 3, after the financial institution A performs an account-processing operation, a process of confirming the account-processing record by the financial institution B and the financial institution C during the account-processing operation process includes following steps.

S311, the financial institution A performs an account-processing operation.

S312, the financial institution A creates a block A based on an account-processing record during the account-processing operation process, and uses the block A to store the account-processing record.

S313, the financial institution A requests other nodes in the consortium blockchain, that is, the financial institution B and the financial institution C, to confirm the block A.

S314, after receiving a confirmation request message from the financial institution A, the financial institution B verifies the confirmation request message based on the signature (i.e., a digital signature) that is on a digest of the account-processing record and that is carried in the confirmation request message and on the account-processing record, and records the block A after the verification succeeds. After recording the block A, the financial institution B sends a feedback message of successful recording to the financial institution A.

S315, after receiving a confirmation request message from the financial institution A, the financial institution C verifies the confirmation request message based on the signature that is on a digest of the account-processing record and that is carried in the confirmation request message and on the account-processing record, and records the block A after the verification succeeds. After recording the block A, the financial institution C sends a feedback message of successful recording to the financial institution A.

S316, after it is determined that all other nodes (other than financial institution B and financial institution C) in the consortium blockchain have confirmed and recorded the block A, the block A is successfully created in the consortium blockchain.

Taking the advantage of the characteristic that information in the consortium blockchain is non-falsifiable and that data uploaded to a block needs to be confirmed by other nodes in the blockchain, the account-processing node uploads all account-processing records to the consortium blockchain. After the account-processing record is confirmed by other nodes other than the account-processing node (that is, account-authenticating nodes), the account-processing records are synchronized. Thus, the blockchain can be synchronized on a plurality of blockchain nodes associated with a blockchain network, and the plurality of blockchain nodes comprises the account-processing node and the one or more account-authenticating nodes. The problem of high falsifiability of original reconciliation data can be avoided, and because each account-processing record is confirmed promptly, effectiveness of a reconciliation process can be improved.

Figure 4:
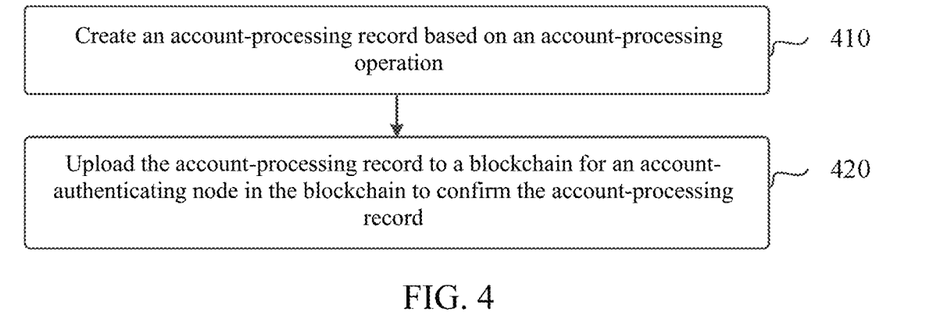
FIG. 4 is a schematic implementation flowchart of applying a consortium-blockchain-based reconciliation method to an account-processing node, according to an embodiment of the specification.

FIG. 4 is a schematic implementation flowchart of applying a consortium-blockchain-based reconciliation method to an account-processing node, according to an embodiment of the specification. As shown in FIG. 4, the method includes following steps.

Step 410, create an account-processing record based on an account-processing operation.

Step 420, upload the account-processing record to a consortium blockchain for an account-authenticating node in the consortium blockchain to confirm the account-processing record.

In an embodiment, the uploading the account-processing record to the consortium blockchain includes: signing a digest of the account-processing record by using a private key of the account-processing node; and uploading the signature (i.e., a digital signature) on the digest of the account-processing record and the account-processing record to the consortium blockchain.

In an embodiment, the method further includes: confirming the account-processing record uploaded by the account-authenticating node to the consortium blockchain.

For a specific implementation of relevant steps in the embodiment shown in FIG. 4, reference may be made to the specific implementation of corresponding steps in the embodiment shown in FIG. 1. The specific implementation is omitted in one or more embodiments of the specification.

Taking the advantage of the characteristic that information in the consortium blockchain is non-falsifiable and that data uploaded to a block needs to be confirmed by other nodes, the account-processing node uploads all account-processing records to the consortium blockchain. After the account-processing records are confirmed by other nodes other than the account-processing node (that is, account-authenticating nodes), the account-processing records are synchronized. The problem of high falsifiability of original reconciliation data is avoided, and because each account-processing record is confirmed promptly, effectiveness of a reconciliation process is improved.

Figure 5:
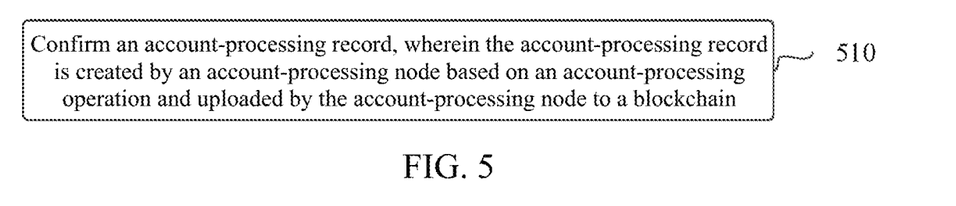
FIG. 5 is a schematic implementation flowchart of applying a consortium-blockchain-based reconciliation method to an account-authenticating node, according to an embodiment of the specification.

FIG. 5 is a schematic implementation flowchart of applying a consortium-blockchain-based reconciliation method to a payment node, according to an embodiment of the specification. As shown in FIG. 5, the method includes following steps.

Step 510, confirm an account-processing record, wherein the account-processing record is created by an account-processing node based on an account-processing operation and uploaded by the account-processing node to a consortium blockchain.

In an embodiment, the account-processing record includes a signature on a digest of the account-processing record and the account-processing record, and therefore, the confirming the account-processing record includes: confirming, by the account-authenticating node, the account-processing record based on the signature on the account-processing record and the account-processing record.

In an embodiment, the confirming the account-processing record includes: confirming the account-processing record based on the signature on the account-processing record and the account-processing record.

In an embodiment, the confirming the account-processing record based on the signature on the digest of the account-processing record and the account-processing record includes: obtaining a first digest of the account-processing record; decrypting the signature on the digest of the account-processing record based on a public key, to obtain a second digest of the account-processing record prior to the signing; and confirming the account-processing record based on whether the first digest is consistent with or identical to the second digest.

In an embodiment, the method further includes: creating different account-processing record based on a different account-processing operation, and uploading the different account-processing record to the consortium blockchain.

For a specific implementation of relevant steps in the embodiment shown in FIG. 5, reference may be made to the specific implementation of corresponding steps in the embodiment shown in FIG. 1, which will be not repeated herein.

Taking the advantage of the characteristic that information in the consortium blockchain is non-falsifiable and that data uploaded to a block needs to be confirmed by other nodes, the account-processing node uploads all account-processing records to the consortium blockchain. After the account-processing records are confirmed by other nodes other than the account-processing node (that is, account-authenticating nodes), the account-processing records are synchronized. The problem of high falsifiability of original reconciliation data is avoided, and because each account-processing record is confirmed promptly, effectiveness of a reconciliation process is improved.

Figure 6:
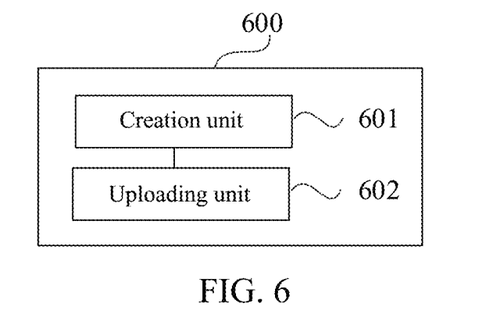
FIG. 6 is a schematic structural diagram of an account-processing node, according to an embodiment of the specification.

FIG. 6 is a schematic structural diagram of an account-processing node 600, according to an embodiment of the specification. Referring to FIG. 6, in a software implementation, the account-processing node 600 may include a creation unit 601 and an uploading unit 602.

The creation unit 601 is configured to create an account-processing record based on an account-processing operation.

The uploading unit 602 is configured to upload the account-processing record to a consortium blockchain for an account-authenticating node in the consortium blockchain to confirm the account-processing record.

In an embodiment, in an implementation, the uploading unit 602 is configured to: sign a digest of the account-processing record by using a private key of the account-processing node; and upload the signature or a digital signature on the digest of the account-processing record and the account-processing record to the consortium blockchain.

In an embodiment, the apparatus further includes a confirmation unit (not shown in the figure), configured to confirm the account-processing record uploaded by the account-authenticating node to the consortium blockchain.

The account-processing node 600 can implement the method in the method embodiment shown in FIG. 4. For details, see the consortium-blockchain-based reconciliation method in the embodiment shown in FIG. 4, and the details will not be repeated herein.

Figure 7:
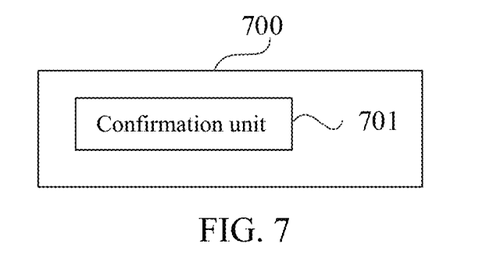
FIG. 7 is a schematic structural diagram of an account-authenticating node, according to an embodiment of the specification.

FIG. 7 is a schematic structural diagram of an account-authenticating node 700, according to an embodiment of the specification. Referring to FIG. 7, in a software implementation, the account-authenticating node 700 may include a confirmation unit 701.

The confirmation unit 701 is configured to confirm an account-processing record, wherein the account-processing record is created by an account-processing node based on an account-processing operation and uploaded by the account-processing node to a consortium blockchain.

In an embodiment, the account-processing record includes a signature on a digest of the account-processing record and the account-processing record, and therefore, the confirmation unit 701 is configured to confirm, by the account-authenticating node, the account-processing record based on the signature on the account-processing record and the account-processing record.

In an embodiment, the confirmation unit 701 is configured to confirm the account-processing record based on the signature on the account-processing record and the account-processing record.

In an embodiment, the confirmation unit 701 is configured to: obtain a first digest of the account-processing record; decrypt the signature on the digest of the account-processing record based on a public key, to obtain a second digest of the account-processing record prior to the signing; and confirm the account-processing record based on whether the first digest is consistent with or identical to the second digest.

In an embodiment, the apparatus further includes: a creation unit (not shown in the figure), configured to create an account-processing record based on an account-processing operation; and an uploading unit (not shown in the figure), configured to upload the account-processing record to the consortium blockchain.

The account-authenticating node 700 can implement the method in the method embodiment shown in FIG. 5. For details, see the consortium-blockchain-based reconciliation method in the embodiment shown in FIG. 5, and the details are not repeated herein.

Figure 8:
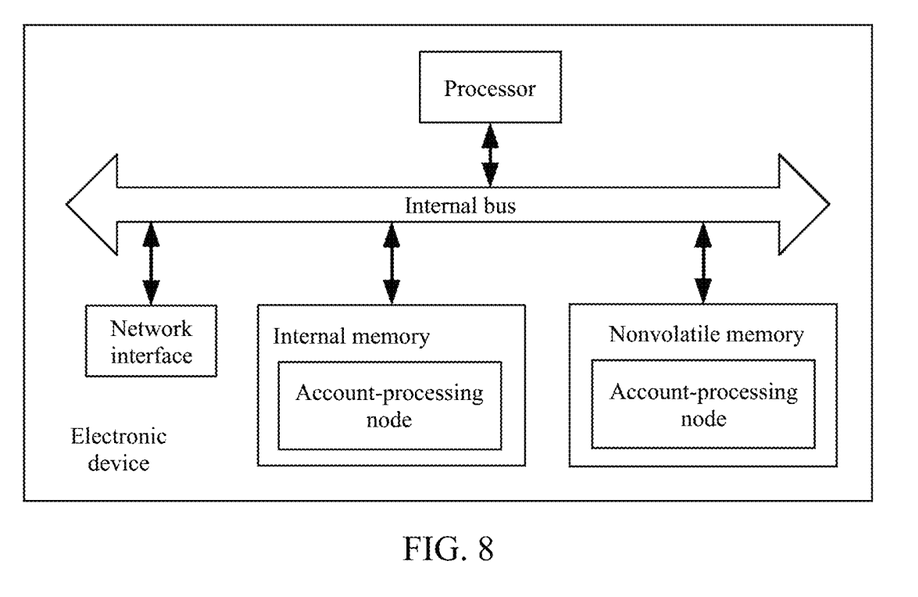
FIG. 8 is a schematic structural diagram of an electronic device, according to an embodiment of the specification.

FIG. 8 is a schematic structural diagram of an electronic device, according to an embodiment of the specification. Referring to FIG. 8, hardware of the electronic device includes a processor, and optionally includes an internal bus, a network interface, and a memory. The memory may include an internal memory, such as a high-speed random access memory (RAM), and may further include a non-volatile memory such as at least one disk memory. Certainly, the electronic device may further include hardware required for other services.

The processor, the network interface and the memory can be connected to each other through an internal bus. The internal bus may be an industry standard architecture (ISA) bus, a peripheral component interconnect (PCI) bus, or an extended industry standard architecture (EISA) bus, or the like. The bus may be classed into an address bus, a data bus, a control bus, and the like. For ease of illustration, only one bidirectional arrow is used in FIG. 8 to represent the bus, but this does not mean that there is only one bus or only one type of bus.

The memory is configured to store a program. Specifically, the program may include program code, and the program code includes computer-executable instructions. The memory may include an internal memory and a non-volatile memory, and provide instructions and data to the processor.

The processor reads a corresponding computer program from the non-volatile memory, and runs the computer program in the internal memory to form an account-processing node logically. The processor executes the program stored in the memory, and is specifically configured to perform the following operations: creating an account-processing record based on an account-processing operation; and uploading the account-processing record to a blockchain, such as a consortium blockchain, for an account-authenticating node in the consortium blockchain to confirm the account-processing record.

The consortium-blockchain-based reconciliation method disclosed in the embodiment shown in FIG. 4 hereof may be applied to a processor or implemented by a processor.

The processor may be an integrated circuit chip and has a signal processing capability. In an implementation process, steps of the foregoing method may be implemented by using a hardware integrated logic circuit in the processor or instructions in a form of software. The processor may be a general processor, including a central processing unit (CPU), a network processor (NP), and the like; or may further be a digital signal processor (DSP), an application-specific integrated circuit (ASIC), a field programmable gate array (FPGA), or another programmable logical device, discrete gate or transistor logical device, or discrete hardware component. The processor can implement or execute each method, step, and logic block diagram disclosed in one or more embodiments in the specification. The general-purpose processor may be a microprocessor, or the processor may be any conventional processor or the like. Steps of the method disclosed with reference to one or more embodiments in the specification may be directly implemented by a hardware decoding processor, or implemented by a combination of hardware in the decoding processor and a software module. The software module may be located in a mature storage medium in the art, such as a RAM, a flash memory, a ROM, a programmable ROM, an electrically erasable programmable memory, or a register. The storage medium is located in the memory, and the processor reads information in the memory and completes the steps in the foregoing methods in combination with hardware of the processor.

The electronic device may also perform the consortium-blockchain-based reconciliation method shown in FIG. 4, details of which are omitted herein.

Definitely, in addition to a software implementation, the electronic device in the specification does not exclude other implementations, for example, a logic device or a combination of software and hardware. In other words, an entity executing the following processing procedure is not limited to the logic units, and may also be hardware or logic devices.

Figure 9:
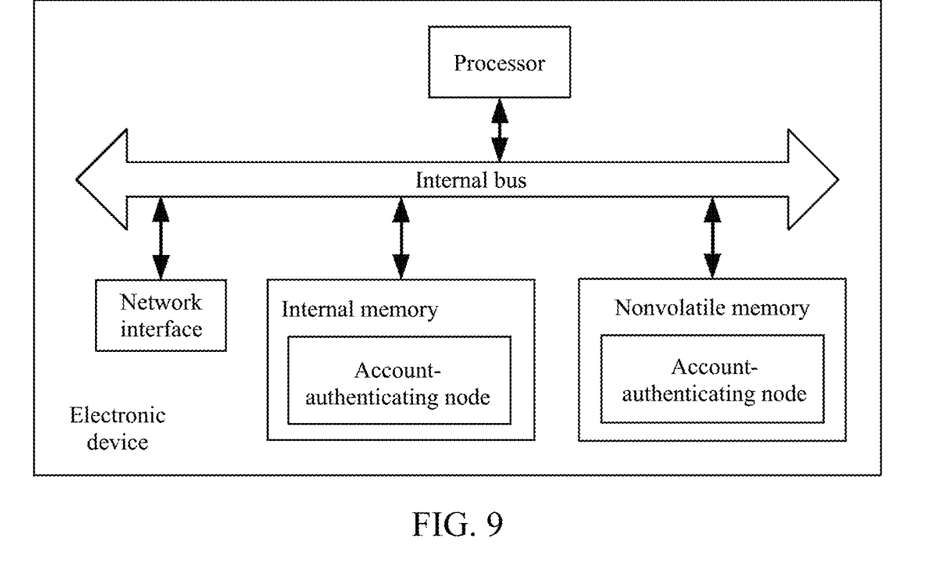
FIG. 9 is a schematic structural diagram of an electronic device, according to another embodiment of the specification.

FIG. 9 is a schematic structural diagram of an electronic device, according to an embodiment of the specification. Referring to FIG. 8, hardware of the electronic device includes a processor, and optionally includes an internal bus, a network interface, and a memory. The memory may include an internal memory, such as a high-speed random access memory (RAM), and may further include a non-volatile memory such as at least one disk memory. Certainly, the electronic device may further include hardware required for other services.

The processor, the network interface and the memory can be connected to each other through an internal bus. The internal bus may be an industry standard architecture (ISA) bus, a peripheral component interconnect (PCI) bus, or an extended industry standard architecture (EISA) bus, or the like. The bus may be classed into an address bus, a data bus, a control bus, and the like. For ease of illustration, only one bidirectional arrow is used in FIG. 9 to represent the bus, but this does not mean that there is only one bus or only one type of bus.

The memory is configured to store a program. Specifically, the program may include program code, and the program code includes computer-executable instructions. The memory may include an internal memory and a non-volatile memory, and provide instructions and data to the processor.

The processor reads a corresponding computer program from the non-volatile memory, and runs the computer program in the internal memory to form an account-authenticating node logically. The processor executes the program stored in the memory, and is specifically configured to perform the following operations: confirming an account-processing record, wherein the account-processing record is created by an account-processing node based on an account-processing operation and uploaded by the account-processing node to a consortium blockchain.

The consortium-blockchain-based reconciliation method disclosed in the embodiment shown in FIG. 9 hereof may be applied to a processor or implemented by a processor.

The processor may be an integrated circuit chip and has a signal processing capability. In an embodiment, steps of the foregoing method may be implemented by using a hardware integrated logic circuit in the processor or instructions in a form of software. The processor may be a general processor, including a central processing unit (CPU), a network processor (NP), and the like; or may further be a digital signal processor (DSP), an application-specific integrated circuit (ASIC), a field programmable gate array (FPGA), or another programmable logical device, discrete gate or transistor logical device, or discrete hardware component. The processor can implement or execute each method, step, and logic block diagram disclosed in one or more embodiments in the specification. The general-purpose processor may be a microprocessor, or the processor may be any conventional processor or the like. Steps of the method disclosed with reference to one or more embodiments in the specification may be directly implemented by a hardware decoding processor, or implemented by a combination of hardware in the decoding processor and a software module. The software module may be located in a mature storage medium in the art, such as a RAM, a flash memory, a ROM, a programmable ROM, an electrically erasable programmable memory, or a register. The storage medium is located in the memory, and the processor reads information in the memory and completes the steps in the foregoing methods in combination with hardware of the processor.

The electronic device may also perform the consortium-blockchain-based reconciliation method shown in FIG. 5, details of which are not repeated herein.

Definitely, in addition to a software implementation, the electronic device in the specification does not exclude other implementations, for example, a logic device or a combination of software and hardware. In other words, an entity executing the following processing procedure is not limited to the logic units, and may also be hardware or logic devices.

Embodiments of the specification are described above. Other embodiments fall within the scope of the appended claims. In some embodiments, the actions or steps recorded in the claims may be performed in sequences different from those in the embodiments and an expected result may still be achieved. In addition, the processes depicted in the accompanying drawings do not necessarily require specific sequences or consecutive sequences to achieve an expected result. In some implementations, multitasking and parallel processing may be feasible or beneficial.

The foregoing descriptions are merely example embodiments of the specification, but are not intended to limit the protection scope of the specification. Any modification, equivalent replacement, or improvement made within the spirit and principle of one or more embodiments of the specification shall fall within the protection scope of one or more embodiments of the specification.

The system, the apparatus, the module or the unit described in the foregoing embodiments can be specifically implemented by a computer chip or an entity or implemented by a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

When the functions disclosed herein are implemented in the form of software functional units and sold or used as independent products, they can be stored in a processor executable non-volatile computer readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments. The storage medium may comprise a flash drive, a portable hard drive, ROM, RAM, a magnetic disk, an optical disc, another medium operable to store program code, or any combination thereof.

The computer readable medium includes a persistent medium and a non-persistent medium, a removable medium and a non-removable medium, which may implement storage of information by using any method or technology. The information may be computer readable instructions, a data structure, a module of a program or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or any other magnetic storage device or any other non-transmission media that may be configured to store information that a computing device can access. Based on the definition in the specification, the computer-readable medium does not include transitory computer readable media (transitory media), such as a modulated data signal and a carrier.

It should also be noted that the terms "include", "comprise" and any other variants mean to cover the non-exclusive inclusion. Thereby, the process, method, article, or device which include a series of elements not only include those elements, but also include other elements which are not clearly listed, or include the inherent elements of the process, method, article and device. Without further limitation, the element defined by a phrase "include one" does not exclude other same elements in the process, method, article or device which include the element.

The embodiments in the specification are all described in a progressive manner, for same or similar parts in the embodiments, refer to these embodiments, and descriptions of each embodiment focus on a difference from other embodiments. Especially, a system embodiment is basically similar to a method embodiment, and therefore is described briefly; for related parts, reference may be made to partial descriptions in the method embodiment.

What is claimed is:

1. A computer-implemented method for blockchain-based reconciliation, comprising:
   creating, by a first blockchain node associated with a blockchain, an account-processing record based on an account-processing operation, wherein the blockchain is synchronized on a plurality of blockchain nodes associated with a blockchain network and the first blockchain node is in a first financial system;
   generating, by the first blockchain node, a digital signature on the account-processing record by encrypting a digest of the account-processing record using a private key associated with the first blockchain node;
   creating, by the first blockchain node, a block storing the account-processing record and the digital signature;
   sending, by the first blockchain node to a plurality of second blockchain nodes comprising each of the blockchain nodes associated with the blockchain network other than the first blockchain node, the created block and a confirmation request message comprising the digital signature for verification, wherein the plurality of second blockchain nodes are in a plurality of separate second financial systems respectively;
   verifying, by each of the plurality of second blockchain nodes, the confirmation request message based on the digital signature to confirm the created block, wherein the verifying comprises confirming that a first digest obtained by applying a hash function on the account-processing record stored in the created block is identical to a second digest obtained by decrypting the digital signature using a public key associated with the first blockchain node;
   recording, by each of the plurality of second blockchain nodes, the block in the blockchain upon confirming that the first digest is identical to the second digest;
   receiving, by the first blockchain node from each of the plurality of second blockchain nodes, a feedback message confirming the recording of the block; and
   determining that the block is successfully created in the blockchain based on the feedback message from each of the plurality of second blockchain nodes.

2. The method of claim 1, further comprising:
   confirming, by the first blockchain node, a different account-processing record uploaded by one of the plurality of second blockchain nodes.

3. The method of claim 1, further comprising:
   creating, by one of the plurality of second blockchain nodes, a different account-processing record based on a different account-processing operation; and
   uploading, by the one of the plurality of second blockchain nodes, the different account-processing record to the blockchain.

4. The method of claim 1, wherein each of the plurality of second blockchain nodes stores full account book information about the first blockchain node.

5. The method of claim 3, wherein the first blockchain node is an account-processing node and the plurality of second blockchain nodes are account-authenticating nodes, and wherein the method further comprises:
   converting the first blockchain node into an account-authenticating node; and
   confirming, by the first blockchain node, the different account-processing record.

6. The method of claim 1, wherein the blockchain comprises a consortium blockchain.

7. A system for blockchain-based reconciliation, comprising a plurality of blockchain nodes associated with a blockchain network that synchronize a blockchain, the blockchain nodes comprising processors and non-transitory computer-readable storage media storing instructions executable by the processors to cause the system to perform operations comprising:
- creating, by a first blockchain node of the blockchain nodes associated with the blockchain network, an account-processing record based on an account-processing operation, wherein the first blockchain node is in a first financial system;
- generating, by the first blockchain node, a digital signature on the account-processing record by encrypting a digest of the account-processing record using a private key associated with the first blockchain node;
- creating, by the first blockchain node, a block storing the account-processing record and the digital signature;
- sending, by the first blockchain node to a plurality of second blockchain nodes comprising each of the blockchain nodes associated with the blockchain network other than the first blockchain node, the created block and a confirmation request message comprising the digital signature for verification, wherein the plurality of second blockchain nodes are in a plurality of separate second financial systems respectively;
- verifying, by each of the plurality of second blockchain nodes, the confirmation request message based on the digital signature to confirm the created block, wherein the verifying comprises confirming that a first digest obtained by applying a hash function on the account-processing record stored in the created block is identical to a second digest obtained by decrypting the digital signature using a public key associated with the first blockchain node;
- recording, by each of the plurality of second blockchain nodes, the block in the blockchain upon confirming that the first digest is identical to the second digest;
- receiving, by the first blockchain node from each of the plurality of second blockchain nodes, a feedback message confirming the recording of the block; and
- determining that the block is successfully created in the blockchain based on the feedback message from each of the plurality of second blockchain nodes.

8. The system of claim 7, wherein the operations further comprise:
- confirming, by the first blockchain node, a different account-processing record uploaded by one of the plurality of second blockchain nodes.

9. The system of claim 7, wherein the operations further comprise:
- creating, by one of the plurality of second blockchain nodes, a different account-processing record based on a different account-processing operation; and
- uploading, by the one of the plurality of second blockchain nodes, the different account-processing record to the blockchain.

10. The system of claim 7, wherein each of the plurality of second blockchain nodes stores full account book information about the first blockchain node.

11. The system of claim 9, wherein the first blockchain node is an account-processing node and the plurality of second blockchain nodes are account-authenticating nodes, and wherein the operations further comprise:
- converting the first blockchain node into an account-authenticating node; and
- confirming, by the first blockchain node, the different account-processing record.

12. The system of claim 7, wherein the blockchain comprises a consortium blockchain.

13. One or more non-transitory computer-readable storage media for blockchain-based reconciliation associated with a plurality of blockchain nodes associated with a blockchain network that synchronize a blockchain, the media being configured with instructions executable by one or more processors to cause the one or more processors to perform operations comprising:
- creating, by a first blockchain node of the blockchain nodes associated with the blockchain network, an account-processing record based on an account-processing operation, wherein the first blockchain node is in a first financial system;
- generating, by the first blockchain node, a digital signature on the account-processing record by encrypting a digest of the account-processing record using a private key associated with the first blockchain node;
- creating, by the first blockchain node, a block storing the account-processing record and the digital signature;
- sending, by the first blockchain node to a plurality of second blockchain nodes comprising each of the blockchain nodes associated with the blockchain network other than the first blockchain node, the created block and a confirmation request message comprising the digital signature for verification, wherein the plurality of second blockchain nodes are in a plurality of separate second financial systems respectively;
- verifying, by each of the plurality of second blockchain nodes, the confirmation request message based on the digital signature to confirm the created block, wherein the verifying comprises confirming that a first digest obtained by applying a hash function on the account-processing record stored in the created block is identical to a second digest obtained by decrypting the digital signature using a public key associated with the first blockchain node;
- recording, by each of the plurality of second blockchain nodes, the block in the blockchain upon confirming that the first digest is identical to the second digest;
- receiving, by the first blockchain node from each of the plurality of second blockchain nodes, a feedback message confirming the recording of the block; and
- determining that the block is successfully created in the blockchain based on the feedback message from each of the plurality of second blockchain nodes.

14. The media of claim 13, wherein the operations further comprise:
- confirming, by the first blockchain node, a different account-processing record uploaded by one of the plurality of second blockchain nodes.

15. The media of claim 13, wherein the operations further comprise:
- creating, by one of the plurality of second blockchain nodes, a different account-processing record based on a different account-processing operation; and
- uploading, by the one of the plurality of second blockchain nodes, the different account-processing record to the blockchain.

16. The media of claim 13, wherein each of the plurality of second blockchain nodes stores full account book information about the first blockchain node.

17. The media of claim 15, wherein the first blockchain node is an account-processing node and the plurality of second blockchain nodes are account-authenticating nodes, and wherein the operations further comprise:
  converting the first blockchain node into an account-authenticating node; and
  confirming, by the first blockchain node, the different account-processing record.

18. The media of claim 13, wherein the blockchain comprises a consortium blockchain.

\* \* \* \* \*